United States Patent [19]

Nauth et al.

[11] Patent Number: 5,213,827

[45] Date of Patent: May 25, 1993

[54] METHOD FOR MANUFACTURE OF PRE-CHEESE AND NATURAL CHEESE

[75] Inventors: K. Rajinder Nauth, Glenview; Barbara Kostak, Mundelein, both of Ill.

[73] Assignee: Kraft General Foods, Inc., Northfield, Ill.

[21] Appl. No.: 825,967

[22] Filed: Jan. 27, 1992

[51] Int. Cl.$^5$ ............................................. A23C 9/12
[52] U.S. Cl. ..................................... 426/36; 426/42; 426/43; 426/491; 426/582
[58] Field of Search ................ 426/36, 40, 34, 42, 426/43, 491, 495, 522, 582

[56] References Cited

U.S. PATENT DOCUMENTS

| | | | |
|---|---|---|---|
| 3,914,435 | 10/1975 | Maubois et al. | 426/40 |
| 3,963,837 | 6/1976 | Maubois et al. | 426/40 |
| 3,988,481 | 10/1976 | Coulter et al. | 426/36 |
| 4,820,530 | 4/1989 | Moran et al. | 426/36 |
| 4,980,179 | 12/1990 | Koenraads et al. | 426/36 |
| 5,037,659 | 8/1991 | Trecker et al. | 426/36 |

Primary Examiner—Joseph Colman
Assistant Examiner—Leslie Wong
Attorney, Agent, or Firm—Fitch, Even, Tabin & Flannery

[57] ABSTRACT

The present invention is directed to a process for manufacture of pre-cheese that is capable of being converted into natural cheese having total solids in excess of 55%. The process includes the steps of removing moisture, salts and lactose from skim milk by a membrane process to provide a retentate having between about 70% and about 83% moisture, between about 0.7% and about 2.5% salts and less than about 1.8% lactose. Cultures capable of metabolizing lactose to lactic acid are added to the retentate and the retentate is fermented until the lactose of the retentate has been substantially converted to lactic acid. Sufficient lactose is provided to reduce the pH of the retentate to within the range of about 4.8 to about 5.6. The fermented retentate is then subjected to centrifugation to provide a concentrate having from about 30% to about 50% total solids. The concentrate is combined with a milk clotting enzyme, fat, salt and a mixed fermentate comprising a high digest casein fermentate, a lipolytic fermentate, a protease, a lipase and a proteolytic micrococcus to provide a cheese base. The cheese base is then fermented to provide a pre-cheese suitable for use in the manufacture of process cheese. In a further embodiment of the present invention, the pre-cheese is texturized to provide a natural cheese by working the pre-cheese in a mechanical mixer.

11 Claims, No Drawings

METHOD FOR MANUFACTURE OF PRE-CHEESE AND NATURAL CHEESE

FIELD OF THE INVENTION

The present invention relates generally to a method for manufacture of a pre-cheese that can be made into a natural cheese. More particularly, the present invention relates to the manufacture of a pre-cheese and natural cheese from a skim milk retentate produced by ultrafiltration. The present invention is particularly suitable for the provision of a pre-cheese that can be used for the preparation of process cheese-type products by a manufacturing method which substantially reduces the amount of time required to convert raw materials to such process cheese-type products.

BACKGROUND OF THE INVENTION

Natural cheese is generally made by adding a microorganism to milk which is capable of metabolizing lactose to produce lactic acid and develop acidity. The milk is usually set with a milk clotting enzyme, such as rennet, or by developing acidity to the isoelectric point of the protein. The set milk is cut, whey separates and is recovered from the resulting curd. The curd may be pressed to provide a cheese block and curing takes place over a period of time under controlled conditions. A product having flavor and body characteristics of natural cheese has been made by replacing at least a portion of the animal fat of the milk with vegetable fat and/or by replacing at least a portion of the casein of the milk with a vegetable protein.

It is well known to provide a product having some of the characteristics of natural cheese by grinding a natural cheese, and heating it with an emulsifying salt. The name given to the resulting product depends upon the ingredients used and its composition and, in some instances, is determined by Regulations promulgated by the U.S. Food and Drug Administration, known as Standards of Identity. For example, the term "pasteurized process cheese" refers to a product comprising a blend of cheeses to which an emulsifying agent, usually an emulsifying salt, and possibly acids, are added, the mixture is then worked and heated into a homogeneous, plastic mass. The moisture level of process cheese generally does not exceed about 44% and process cheese has a minimum fat level of about 40%, on a dry basis, under the Standards.

As used herein, the term "process cheese-type products" is intended to include those products known and referred to as "pasteurized process cheese", "pasteurized process cheese food", "pasteurized process cheese spread" and "pasteurized process cheese product". The term "process cheese-type products" shall also be deemed to include products resembling process cheese, process cheese food, process cheese spread and process cheese product, but which may not meet the Standards for any of the above products in that they contain ingredients not specified by such Standards, such as vegetable oil or vegetable protein, or do not meet the compositional requirements of such Standards. The term, process cheese-type products, shall be deemed to include any product, including but not limited to those referred to above, having the flavor and texture of a process cheese-type product regardless of the ingredients or manufacturing steps employed, and regardless of whether the Standards are met.

As indicated, presently known process cheese-type products may use a natural cheese or a cheese analog as a principal ingredient. The manufacture of natural cheese or cheese analog for these products can require extended curing times to develop the desired flavor. Generally, the amount of flavor developed is proportional to the length of time of curing and the extent of breakdown of the cheese. For instance, cheddar cheese which is cured for a relatively short period of time, e.g., 10 days, and which is referred to as "current cheese", has little cheese flavor or breakdown of the body; cheddar cheese which is cured from about 3 to 6 months, is referred to as "short hold cheese" and has increased flavor with increased body breakdown; and cheddar cheese which is cured for periods in excess of about 6 months and up to a year or more, is referred to as "long hold cheese" or "fully aged cheese", and has a high cheese flavor with more body breakdown. Process cheese-type products may comprise a blend of these cheeses to provide the desired flavor, body and texture to the final product. However, this method of manufacture of process cheese-type products makes it necessary to store cheese for substantial periods of time. Such storage is expensive and it would be desirable to provide a method for the manufacture of process cheese-type products in a much shorter period of time so as to avoid the need for any extended storage of cheese. Further, present methods of manufacturing process cheese-type products may require selection and proportioning of the cheese ingredients which requires special techniques and can result in flavor variations. It would be desirable to provide more consistent raw materials and manufacturing processes. Accordingly, many processes have been developed to produce natural cheese, a cheese base or a pre-cheese that is suitable for manufacture of process cheese.

It is also known that natural cheese can be manufactured using milk which has been subjected to membrane processing, such as ultrafiltration, to produce a retentate through removal of salts, lactose and water. Cheese making cultures are added to the retentate and the retentate is fermented, usually in the presence of a milk coagulating enzyme, such as rennet, to provide a coagulum. The resulting coagulum is cut or broken to cause syneresis resulting in whey separation. The whey is drained and the curd is processed. The type of cheese cultures used and the processing varies with the desired cheese product. The curd may then be salted, placed in molds and pressed to allow further whey drainage. The salting may be delayed until the curd is formed. The cheese is then ripened to the extent desired.

One of the shortcomings of the foregoing process utilizing a retentate and natural cheese processes, in general, is that serum protein and the portion of the cheese-clotting enzyme that is not utilized in the production of the coagulum is lost when the whey is drained. In the typical cheese-making process, more cheese clotting enzyme is added during the manufacturing process than is required to compensate for the loss of the enzyme in the drainage step. The presence of the milk clotting enzyme during the curing step serves to convert kappa casein to para kappa casein during curing of the cheese.

U.S. Pat. No. 4,820,530 to Moran, et al. describes a process for manufacture of a high solids cheese produced by fermenting and evaporating a milk retentate. The retentate is fermented to a pH above the isoelectric point without coagulation and the fermented retentate is spread on a surface under vacuum. Moisture is evaporated from the retentate under quiescent conditions to provide a curd having a total solids content of 55% or more. The curd is doctored off from the surface without substantially disrupting the curd structure and the curd is collected with minimum working of the curd and without substantial breakdown of the curd structure.

U.S. Pat. No. 3,988,481 to Coulter, et al. is directed to the preparation of cheese from milk which has been delactosed and dewatered by a process involving molecular sieving the milk to substantially separate and remove lactose and water soluble minerals from the milk to render the milk substantially sugar-free. Molecular sieving may be accomplished by gel filtration using a manufactured gel filtering agent, such as those sold under the tradenames Sephadex TM and BioGel TM or by electrodialysis or by reverse osmosis. The delactosed and partially demineralized milk product, containing principally protein in the form of casein and water and with or without fat is then concentrated to about 40-50% solids by removing water, as in a conventional vacuum evaporator supplemented by evaporation under vacuum in a swept surface evaporator or in a spray drier. A milk clotting enzyme is then added to the evaporated milk product and the resulting curd in the cheese-making mixture is then subjected to conventional manipulation to promote curd formation without any substantial syneresis. The resulting cheese is then molded.

The examples of the Coulter, et al. patent describe a laboratory procedure for preparation of skim milk colloid using a centrifugal Sephadex fractionation treatment, such as described by Morr, et al. in the *Journal of Dairy Science*, Vol. 50, No. 3, pp. 305-306 (1967). The technique of gel filtration with Sephadex G-75 and G-100 columns has been used to fractionate skim milk and whey proteins. This technique also separates the proteins from the low molecular weight components of skim milk, such as the lactose, amino acids, riboflavin and other soluble materials. The process described in the Morr, et al. article is an improvement of the Sephadex column method in that the separation into the fractions is accelerated by use of a centrifuge. The procedure consists of four major steps per cycle: (a) the sample is distributed evenly over the inside surface of the slowly rotating ($60 \times g$) Sephadex bed by means of a glass-tipped delivery tube leading from the sample container. (b) the rotor is rotated at $1,000 \times g$ for 10-15 minutes to spin the colloidal components of sufficient size to be excluded from the interior volume of the Sephadex gel. The colloidal components are drained continuously from the centrifuge head and collected in a number of separate fractions. (c) the rotor is slowed to $60 \times g$ and the Sephadex is eluted with up to two bed volumes of deionized water, to remove the lactose and other low molecular weight components contained in the interior volume of the Sephadex. The effluent is also drained continuously from the rotor and collected in a number of separate fractions. (d) the rotor speed is increased to a force of $1,000 \times g$ to spin out the excess eluant from the Sephadex and to prepare the bed for the next sample. The total time required for each complete cycle is approximately 30 minutes. The centrifugal Sephadex procedure for molecular sieving of milk is not suitable for large scale commercial manufacture of a delactosed milk fraction that could be used in the manufacture of cheese.

U.S. Pat. No. 3,899,596 to Stenne, dicloses a process for the production of cheese which comprises treating milk by ultrafiltration to obtain a product having at least some of the protein constituents of the milk, adding rennet to the liquid product after inoculation with suitable ferments, and introducing a batch of the renneted liquid into a vertical chamber in which it is left to coagulate. The coagulum is cut into slabs which provide the end product cheese.

U.S. Pat. No. 3,914,435 to Maubois, et al., also teaches cheese made from heat-treated milk and without conventional draining of whey by a process which involves ultrafiltering of the milk to produce a retentate and adding rennet to the retentate to cause coagulation to produce cheese curd and thereafter converting the curd into cheese.

U.S. Pat. No. 4,401,679 to Rubin, et al., discloses a process for preparing cheese base by concentrating milk through ultrafiltration, combined with diafiltration and evaporation, wherein the retentate from the ultrafiltration is inoculated with an acid culture before evaporation, and after evaporation, acidification proceeds to completion in packaging.

Cheese base material has been taught by evaporating moisture from retentate under turbulent conditions to provide a lower moisture concentrate. Such a process is described in an article by Ernstrom, et al. entitled "Cheese Base for Processing: A High-Yield Product from Whole Milk by Ultrafiltration", *Journal of Dairy Science*, Volume 63, pp. 228-234 (1980). The article describes a process wherein whole milk of normal pH, or acidified to a pH of 5.7, is concentrated by ultrafiltration to about 40% of the original milk weight and diafiltered at constant volume until a desired ratio of lactose to buffer capacity is established. Then, the retentate is further concentrated by ultrafiltration to 0% of the original milk weight. The retentate is then inoculated with cheese starter and incubated to completely ferment the residual lactose, pH control being achieved by controlling the level of lactose from the diafiltration step of the process. The product is further concentrated in a swept-surface vacuum-pan evaporator or a Luwa evaporator. It is pointed out that the use of a batch evaporator is necessitated when the retentate, upon fermentation, curdles or coagulates, since such a product cannot be readily processed in any continuous-flow evaporator.

PCT application WO 82/01806 to Jameson is directed to a process for producing cheese or cheese base containing substantially all the casein and whey proteins originally present in milk. In general, the PCT application discloses a process which permits efficient evaporation of water from fermented retentate. The process includes four steps: (1) selective concentration of milk to form a retentate; (2) increasing the ionic strength by the addition of salt, such as sodium chloride, to the retentate so as to maintain it in the liquid phase during fermentation; (3) fermenting the retentate; and (4) removing water from the fermented retentate to produce cheese or cheese base containing substantially all the casein and whey proteins originally present in the milk.

In the conventional making of cheese with rennet, the macro peptides formed by rennet action are lost in the whey with consequent reduction in yield and loss of milk protein material. It would be desirable to utilize the benefit of rennet action while avoiding whey removal with consequent loss of macro peptides.

Further, prior art methods for making cheese base materials at higher-solids with evaporation, in which evaporation is effected with high turbulence or the cheese base material is recovered with substantial working after evaporation, has resulted in destabilization of the higher-solids cheese base material, and a body and texture unlike various cheeses. This destabilization is particularly noticeable at total solids level in excess of about 60 to 62%, e.g., a cheese such as cheddar cheese, but is also present at a total solids level as low as 55%. Accordingly, cheese base materials heretofore produced by evaporating retentates to a total solids in excess of 60% generally have not provided the typical body and texture characteristics of high-solids natural cheeses.

The prior art teaches many different steps in respect to the manufacture of cheeses and cheese base materials from milk retentates. Much of the prior art is directed toward the manufacture of higher moisture or soft cheeses, and it has not been directed toward the production of high-solids natural cheeses from retentates.

It is a principal object of the present invention to provide a curd and a pre-cheese from a retentate by means of centrifugation techniques which is suitable for use in the manufacture of process type cheese.

It is a further object of the present invention to provide a pre-cheese which can be manufactured into a natural cheese.

It is another object of the present invention to provide a method for the manufacture of a pre-cheese and a natural cheese by a method wherein a milk clotting enzyme is added to a concentrate or retentate and the pre-cheese and natural cheese are made by a method which does not involve a subsequent whey drainage step.

These and other objects will become more apparent from the following detailed description and the accompanying claims.

SUMMARY OF THE INVENTION

The present invention is directed to a process for manufacture of pre-cheese that is capable of being converted into natural cheese having total solids in excess of 55%. The process includes the steps of removing moisture, salts and lactose from skim milk by a membrane process to provide a retentate having between about 70% and about 83% moisture, between about 0.7% and about 2.5% salts and less than about 1.8% lactose. Cultures capable of metabolizing lactose to lactic acid are added to the retentate and the retentate is fermented until the lactose of the retentate has been substantially converted to lactic acid. Sufficient lactose is provided to reduce the pH of the retentate to within the range of about 4.8 to about 5.6. The fermented retentate is then subjected to centrifugation to provide a concentrate having from about 30% to about 50% total solids. The concentrate is combined with a milk clotting enzyme, fat, salt and a mixed fermentate comprising a high digest casein fermentate, a lipolytic fermentate, a protease, a lipase and a proteolytic micrococcus to provide a cheese base. The cheese base is then fermented to provide a pre-cheese suitable for use in the manufacture of process cheese. In a further embodiment of the present invention, the pre-cheese is texturized to provide a natural cheese by working the pre-cheese in a mechanical mixer.

DETAILED DESCRIPTION OF THE INVENTION

In accordance with the present invention, skim milk is treated by known membrane processes to provide a retentate having between about 70% and about 83% moisture, between 0.7% and about 2.5% salts, between about 0.8% and less than about 1.8% lactose and about 3% fat.

Various techniques are known in the art for achieving the indicated retentates, for example, ultrafiltration, with or without diafiltration. Commercial apparatus is marketed and available for the preparation of such retentates, and the apparatus is in present use in the cheese industry. The operation of such apparatus is within the skill of the art. Preferably, in the practice of the invention, the skim milk is treated by ultrafiltration and diafiltration to provide the desired level of constituents in the retentate.

In an important embodiment of the present invention, it has been determined that the retentate can be dried and reconstituted with water prior to use in the present invention. Drying may be effected by various means, such as spray drying, provided that reconstitutability is not affected, and results in providing a dried retentate having about 4% moisture. If desired, the dried retentate can be reconstituted with water to a higher solids level than is readily attainable in the membrane delactosing process. The reconstituted retentate preferably has solids in the range of from about 60% to about 80%.

The retentate, or reconstituted retentate, is then fermented by mixing with conventional cheese cultures or starters, and particularly those commercially available and normally used in the manufacture of American-type cheeses, such as *Streptococcus lactis, Streptococcus cremoris* and other well known organisms.

The fermentation is continued until the acid in the retentate has lowered the pH to within the range of between about 4.8 and about 5.6. Because of the low level of lactose in the retentate, the fermentation process is self-limiting. While the pH of the retentate is seldom reduced to the isoelectric point of the casein, the formation of an acid coagulum is not detrimental to the process of the present invention. The fermentation step usually takes from about 8 to about 16 hours.

Free moisture is then removed from the fermented retentate by subjecting the retentate to centrifugal separation. Any suitable type of centrifuge may be used; but it is, of course, desirable to use a continuous centrifuge for production purposes. The centrifuge may be a disk centrifuge, which is the commonest type of clarifier centrifuge or can be a centrifuge which filters; that is, causes the liquid to flow through a bed of solids held on a screen or through a filter membrane. The centrifugal separation step provides a concentrate having from about 30% to about 50% solids. Centrifugation is effected at between about 5000 rpm and about 7000 rpm. The concentrate is a thick, viscous, homogeneous mass which resembles Baker's cheese in consistency.

The concentrate is transferred to a suitable mixer, such as a Lanco blender, and is combined with a milk clotting enzyme, fat, salt and a mixed fermentate to provide a cheese base. The milk clotting enzyme, preferably rennet, is added at a level of between about 0.002% and about 0.05% to the concentrate after the other components are added. Due to the high concentration of solids in the concentrate, the action of the rennet to form the coagulum is rapid and mixing is preferably finished before a coagulum is formed.

The cheese base preferably comprises from about 45% to about 55% of the concentrate, from about 25% to about 45% of fat, from about 3% to about 10% of the mixed fermentate and from about 0.5% to about 1.5% of salt. The milk clotting enzyme is added at a level sufficient to form a coagulum and to convert the kappa casein to para kappa casein during the holding period. Total solids of the cheese base is between about 50% to about 70% and the cheese base has from about 20% to about 30% of fat.

The fat is preferably provided from a concentrated cream having from about 68% to about 72% milk fat. The concentrated cream is added to the concentrate at a level sufficient to provide from about 40% to about 50% of the cream in the cheese base.

The mixed fermentate is described in detail in U.S. Pat. No. 4,244,971 to Wargel, et al., the teachings of which are incorporated herein by reference. In accordance with the Wargel, et al. patent, a mixed fermentate is provided by treating a skim milk retentate with a proteolytic enzyme to provide a proteolytic fermentate, treating cream with a lipolytic enzyme to provide a lipolytic fermentate and combining the two fermentates with additional casein, a proteolytic enzyme, a lipolytic enzyme and a proteolytic micrococcus. The mixed fermentate, in combination with the added milk clotting enzyme, serves to break down protein and fat in the cheese base. The mixed fermentate has from about 40% to about 50% of total solids and from about 20% to about 35% of fat.

The cheese base is then transferred to suitable containers and held for a period of time to provide a pre-cheese. The cheese base is held for a period of about 1 week at 70° F. Thereafter, the containers holding the cheese base are transferred to a cold room and are held for a period of from about 2 to about 5 weeks at about 45° F. to provide the pre-cheese. At this time, which is a relatively short time, as compared to the manufacture of cheddar cheese by conventional procedures, substantial flavor has been developed. The texture of the pre-cheese, however, remains crumbly and the pre-cheese is not suitable for sale as a natural cheese. The pre-cheese, however, is particularly suitable for use in the manufacture of process-type cheese.

A natural cheese can be prepared from the pre-cheese by texturizing the pre-cheese. The texturization is accomplished by working the pre-cheese in a suitable mechanical mixing device, such as a Sigma mixer. A plastic curd cheese, such as Mozzarella-type cheese, can be prepared by working the pre-cheese in conventional auger conveyors while transporting the pre-cheese through heated water. The texturization of the pre-cheese to form a natural cheese is aided by adding dried retentate to the pre-cheese during or prior to working the cheese in the mechanical mixer. The dried retentate is preferably added to the pre-cheese at a level of from about 5% to about 25%, based on the weight of the pre-cheese.

Texturization of the pre-cheese can also be aided by incorporating fat into the pre-cheese prior to or during working of the pre-cheese. The fat is preferably a concentrated cream having from about 68% to about 72% of milk fat which is added to the pre-cheese at a level of from about 1% to about 10%, based on the weight of the pre-cheese. Other fats, such as vegetable fats and modified fats, such as low cholesterol cream of butterfat may also be used.

All percentages used herein are by weight and all temperatures are degrees Fahrenheit unless otherwise indicated.

The following examples further illustrate various features of the invention but are in no way intended to limit the scope of the invention as set forth in the appended claims.

EXAMPLE 1

Skim milk is treated by ultrafiltration and diafiltration to provide a retentate having 30% solids, 0.8% lactose, 0.25% salts and 2% milk fat. The retentate is spray dried to provide a dried retentate having 3.6% moisture.

300 pounds of the dried retentate is mixed with 700 pounds of water to provide a reconstituted retentate having 30% solids. 900 ml of a mixed culture of mesophilic lactococci, such as *S. lactis, S. cremoris and S. diacetylactis* is added to the retentate and the retentate is fermented for 18 hours at 72° F. to a pH of 5.2.

The fermented retentate is processed through a continuous centrifuge to provide a concentrate having 42% total solids. The concentrate (707 pounds) is blended with 70.6 pounds of mixed fermentate, 637 pounds of plastic cream having 67% milk fat, 14.1 pounds of salt and 1 ounce of rennet to provide a cheese base having 58.3% total solids and 36.2% fat.

The cheese base is held at 70 F. for one week at 45° F. for 3 weeks to provide a pre-cheese. The pre-cheese has a characteristic aged cheddar flavor and is suitable for use in the manufacture of process-type cheese. The body of the pre-cheese, however, is loose and crumbly.

A natural cheese type is made from the pre-cheese by texturizing the pre-cheese in a Farinograph type mixer. 100 pounds of the pre-cheese is added to the mixer along with 22 pounds of dried retentate. The mixture was heated to 140° F. and mixing was continued for a period of 15 minutes to provide a smooth, shiny, elastic natural cheese type product.

What is claimed is:

1. A process for manufacture of a pre-cheese that is capable of being converted into natural cheese having total solids in excess of 55% comprising the steps of:
    (a) removing moisture, salts and lactose from skim milk by a membrane process to provide a retentate having between about 70% and about 83% moisture, between about 0.7% and about 2.5% salts and less than about 1.8% lactose;
    (b) adding cultures capable of metabolizing lactose to lactic acid to said retentate and fermenting said retentate until said lactose of said retentate has been substantially converted to lactic acid;
    (c) centrifuging said fermented retentate to provide a concentrate having from about 30% to about 50% solids;
    (d) combining said concentrate with a milk clotting enzyme, fat, salt and a mixed fermentate comprising a high digest casein fermentate, a lipolytic fermentate, casein, a protease, a lipase and a proteolytic micrococcus to provide a cheese base; and
    (e) fermenting said cheese base to provide a pre-cheese.

2. A process in accordance with claim 1 wherein said retentate is dried and reconstituted with water to a moisture level of from about 60% to about 80% prior to being used in step (b).

3. A method in accordance with claim 1 wherein said cheese base comprises from about 55% to about 65% total solids and from about 40% to about 55% fat, dry solids basis.

4. A method in accordance with claim 1 wherein said fat is concentrated cream having from about 67% to about 72% of milk fat.

5. A method in accordance with claim 4 wherein said cheese base comprises from about 45% to about 55% of said concentrate, from about 40% to about 50% of said ream, from about 3% to about 10% of said mixed fermentate, from about 0.5% to about 1.5% of salt and sufficient rennet to coagulate the casein in said cheese base.

6. A process in accordance with claim 1 wherein said pre-cheese is texturized to provide a natural cheese by working said pre-cheese in a mechanical mixer.

7. A process in accordance with claim 6 wherein dried retentate is added to said pre-cheese prior to or while working said pre-cheese.

8. A method in accordance with claim 7 wherein said dried retentate is added at a level of form about 5% to about 25% based on the weight of said pre-cheese.

9. A method in accordance with claim 7 wherein fat is added to said pre-cheese prior to or while working said pre-cheese.

10. A process in accordance with claim 9 wherein said fat is a concentrated cream having from about 67% to about 72% of milk fat.

11. A process in accordance with claim 10 wherein said cream is added at a level of from about 1% to about 10%, based on the weight of said pre-cheese.

* * * * *